United States Patent
Kauper et al.

(10) Patent No.: US 12,420,346 B2
(45) Date of Patent: Sep. 23, 2025

(54) REAMER WITH FRONT GASH DESIGN

(71) Applicant: Kennametal Inc., Latrobe, PA (US)

(72) Inventors: Herbert R. Kauper, Rosstal (DE); Juergen Schwaegerl, Vohenstrauss (DE); Li Ning, Pleasant Unity, PA (US)

(73) Assignee: KENNAMETAL INC., Latrobe, PA (US)

( * ) Notice: Subject to any disclaimer, the term of this patent is extended or adjusted under 35 U.S.C. 154(b) by 568 days.

(21) Appl. No.: 17/702,866

(22) Filed: Mar. 24, 2022

(65) Prior Publication Data
US 2023/0302556 A1 Sep. 28, 2023

(51) Int. Cl.
*B23D 77/00* (2006.01)

(52) U.S. Cl.
CPC ................. *B23D 77/006* (2013.01)

(58) Field of Classification Search
CPC .... B23D 77/006; B23D 77/00; B23D 77/003; B23D 2277/205; B23D 2277/30; B23D 2277/105; B23D 2277/72; B23D 2277/44; B23D 2277/26; B23D 2277/04; B23D 2277/32; B23D 2277/62; B23B 2220/44
See application file for complete search history.

(56) References Cited

U.S. PATENT DOCUMENTS

| | | | |
|---|---|---|---|
| 2,822,607 A | 2/1958 | Bennett | |
| 8,123,442 B2 | 2/2012 | Paul et al. | |
| 8,398,341 B2 | 3/2013 | Cohen | |
| 8,568,068 B2 | 10/2013 | Kleiner et al. | |
| 8,764,354 B2 | 7/2014 | Schuffenhauer et al. | |
| 9,902,002 B2 | 2/2018 | Ning et al. | |
| 2005/0169721 A1 | 8/2005 | Schulte | |

(Continued)

FOREIGN PATENT DOCUMENTS

| | | | | |
|---|---|---|---|---|
| CN | 108176896 A | * | 6/2018 | ............ B23D 77/00 |
| DE | 103 48 061 A1 | | 5/2005 | |

(Continued)

OTHER PUBLICATIONS

Translation of CN108176896, Gao et al, Burnishing reamer for high precision deep hole machining, Jun. 19, 2018, pp. 3 (Year: 2018).*

(Continued)

*Primary Examiner* — Nicole N Ramos
(74) *Attorney, Agent, or Firm* — John A. Wilaj, Jr.

(57) ABSTRACT

A reamer includes a shank portion extending from a rear end and a cutting portion extending from the shank portion to a front end. The cutting portion includes a plurality of cutting teeth separated by gashes. Each cutting tooth having a cutting edge extending in a longitudinal direction from the front end to proximate the shank portion. The cutting portion includes a margin trailing each cutting edge and extends along each cutting edge to proximate the shank portion. Each cutting tooth also has a primary relief formed between the cutting edge and the front end and a secondary relief extending longitudinally between the margin of one cutting tooth to the cutting edge of an adjacent cutting tooth. A width, W, of each cutting tooth increases in a radially outward direction with respect to the central, longitudinal axis when viewed from the front end of the reamer.

20 Claims, 7 Drawing Sheets

(56) References Cited

U.S. PATENT DOCUMENTS

| | | |
|---|---|---|
| 2009/0053001 A1 | 2/2009 | Cohen |
| 2010/0143055 A1 | 6/2010 | Kleiner et al. |
| 2010/0247257 A1 | 9/2010 | Paul |
| 2012/0121344 A1 | 5/2012 | Schuffenhauer et al. |
| 2013/0115017 A1* | 5/2013 | Schanz ................ B23D 77/006 |
| | | 408/229 |
| 2016/0082535 A1 | 3/2016 | Ning et al. |
| 2020/0055125 A1* | 2/2020 | Schulte .................. B23B 51/00 |
| 2021/0060675 A1* | 3/2021 | Okamoto ............. B23D 77/006 |
| 2021/0354210 A1 | 11/2021 | Schwägerl et al. |

FOREIGN PATENT DOCUMENTS

| | | |
|---|---|---|
| DE | 10348061 | 9/2005 |
| DE | 10 2013 205 026 A1 | 9/2014 |
| EP | 2719489 A1 | 4/2014 |
| KR | 20120020911 A | 3/2012 |
| WO | 2009149693 A2 | 12/2009 |

OTHER PUBLICATIONS

Extended European Search Report for European Application No. EP23162556, mailed Dec. 4, 2023, 11 Pages.

* cited by examiner

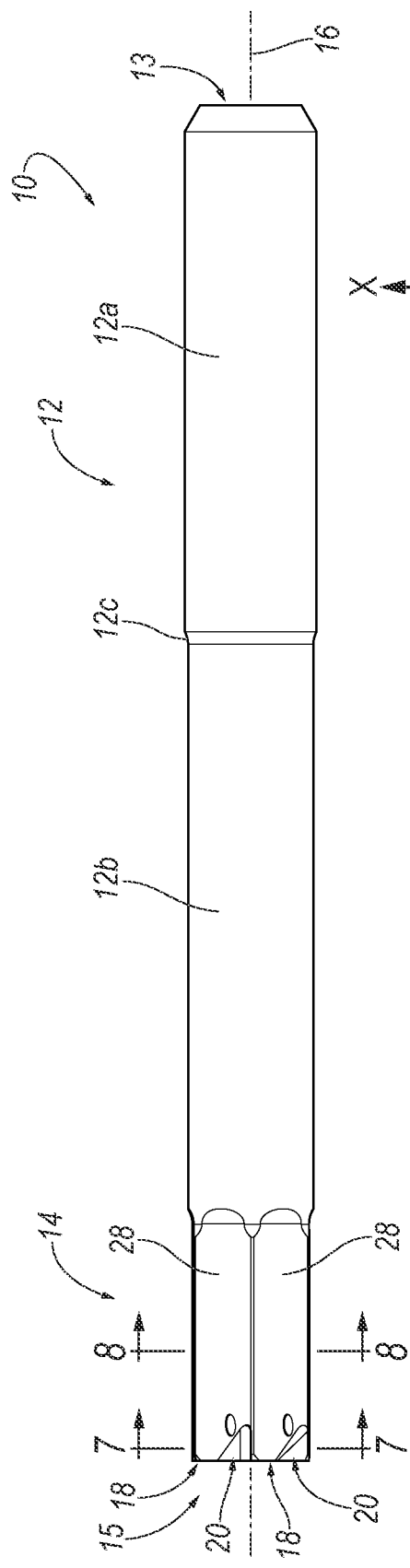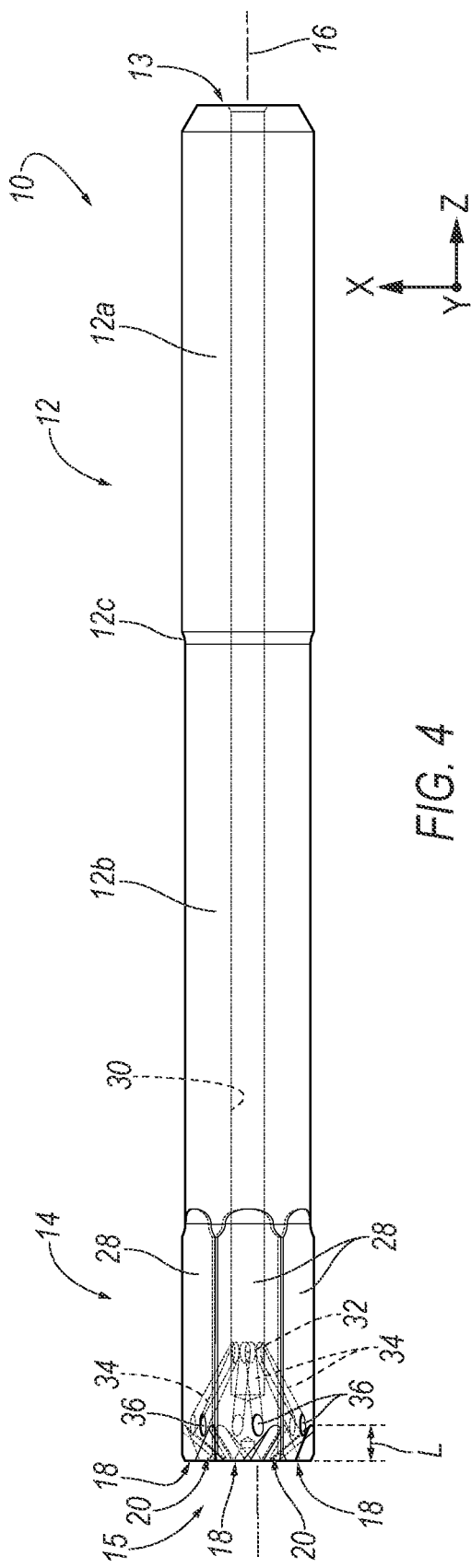
FIG. 3
FIG. 4

REAMER WITH FRONT GASH DESIGN

BACKGROUND OF THE INVENTION

Known rotary cutting tools for performing reaming operations, such as a reamer, typically comprise a cutting head having an axis of rotation. The cutting head has a forward end and a peripheral surface extending rearwardly therefrom. The peripheral surface includes at least two cutting inserts or teeth extending rearwardly from the forward end and separated by a chip flute for the evacuation of chips produced during the cutting operation.

Some conventional cutting head designs push the chips forward, through the hole using radial coolant in the flutes directed toward the cutting edges. However, the natural chip flow of the material, combined with the cutting geometry, causes the chip to want to flow backward directly into the chip flute during the cutting operation. This is not ideal because the chips may damage the hole surface and cause edge chipping.

SUMMARY OF THE INVENTION

The problem of chips moving backward during a reaming operation is solved by providing a reamer with a front gash design without flutes, thereby ensuring the chips move forward during the reaming operation.

In one aspect, a reamer comprises a shank portion extending from a rear end and a cutting portion extending from the shank portion to a front end. The cutting portion includes a plurality of cutting teeth separated by gashes. Each cutting tooth having a cutting edge extending in a longitudinal direction from the front end to proximate the shank portion. The cutting portion includes a margin trailing each cutting edge and extends along each cutting edge to proximate the shank portion. Each cutting tooth also has a primary relief formed between the cutting edge and the front end and a secondary relief extending longitudinally between the margin of one cutting tooth to the cutting edge of an adjacent cutting tooth. A width, W, of each cutting tooth increases in a radially outward direction with respect to the central, longitudinal axis when viewed from the front end of the reamer.

In another aspect, a reamer comprises a shank portion extending from a rear end and a cutting portion extending from the shank portion to a front end. The cutting portion includes a plurality of cutting teeth separated by gashes. Each cutting tooth having a cutting edge extending in a longitudinal direction from the front end to proximate the shank portion. The cutting portion includes a margin trailing each cutting edge and extends along each cutting edge to proximate the shank portion. Each cutting tooth also has a primary relief formed between the cutting edge and the front end and a secondary relief extending longitudinally between the margin of one cutting tooth to the cutting edge of an adjacent cutting tooth. Each gash extends a length, L, in the longitudinal direction from the front end of the reamer in the range between about 0.05×D mm and about 1.0×D mm, where D is the cutting diameter of the reamer. A distance, d, between the secondary relief of each tooth and the cutting diameter, D, of the reamer is smaller than the size of the chips generated during a reaming operation, thereby minimizing or preventing the chips from moving rearwardly of each gash

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 3 is a side view of the reamer of FIG. 1;

FIG. 4 is another side view of the reamer of FIG. 1 with the coolant system shown in phantom;

DETAILED DESCRIPTION OF THE INVENTION

Figure 1:
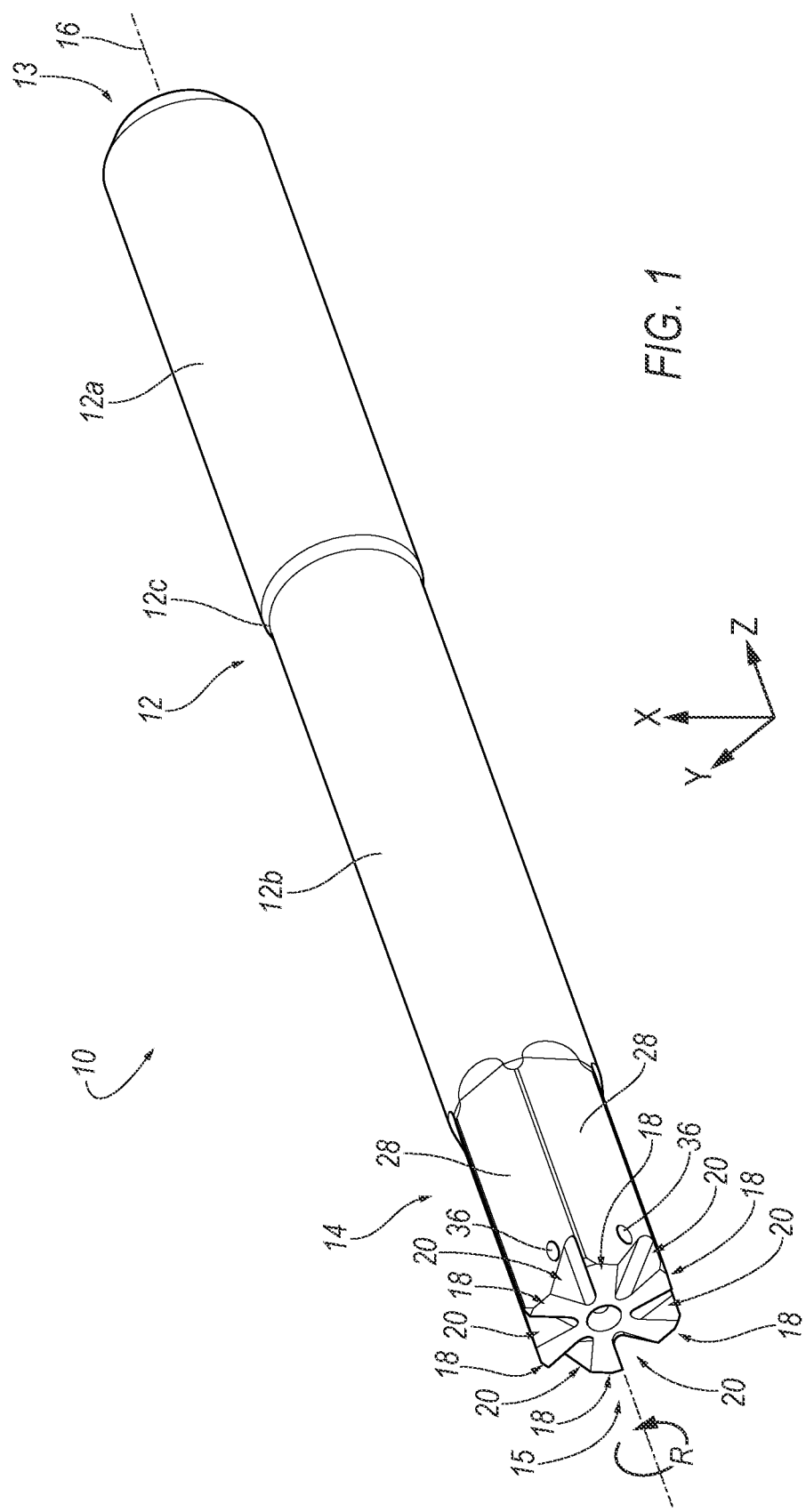
FIG. 1 is a front isometric view of a reamer according to an embodiment of the disclosure.

Below are illustrations and explanations for a version of a cutting tool, such as a reamer, and the like, for machining a workpiece (not shown). However, it is noted that the cutting tool may be configured to suit any specific application, such as orbital drilling, end milling, and the like, and is not limited only to the example in the illustrations.

The description herein of specific applications should not be a limitation on the scope and extent of the use of the cutting tool.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, a "gash" is defined as the profile on the front face of the reamer that does not extend along the tool body but extends radially forming a chip gash.

As used herein, a "flute" is defined as the profile on the front surface that extends axially along the tool body (z-axis) to form chip flutes. The flute can be either straight or helical.

Figure 2:
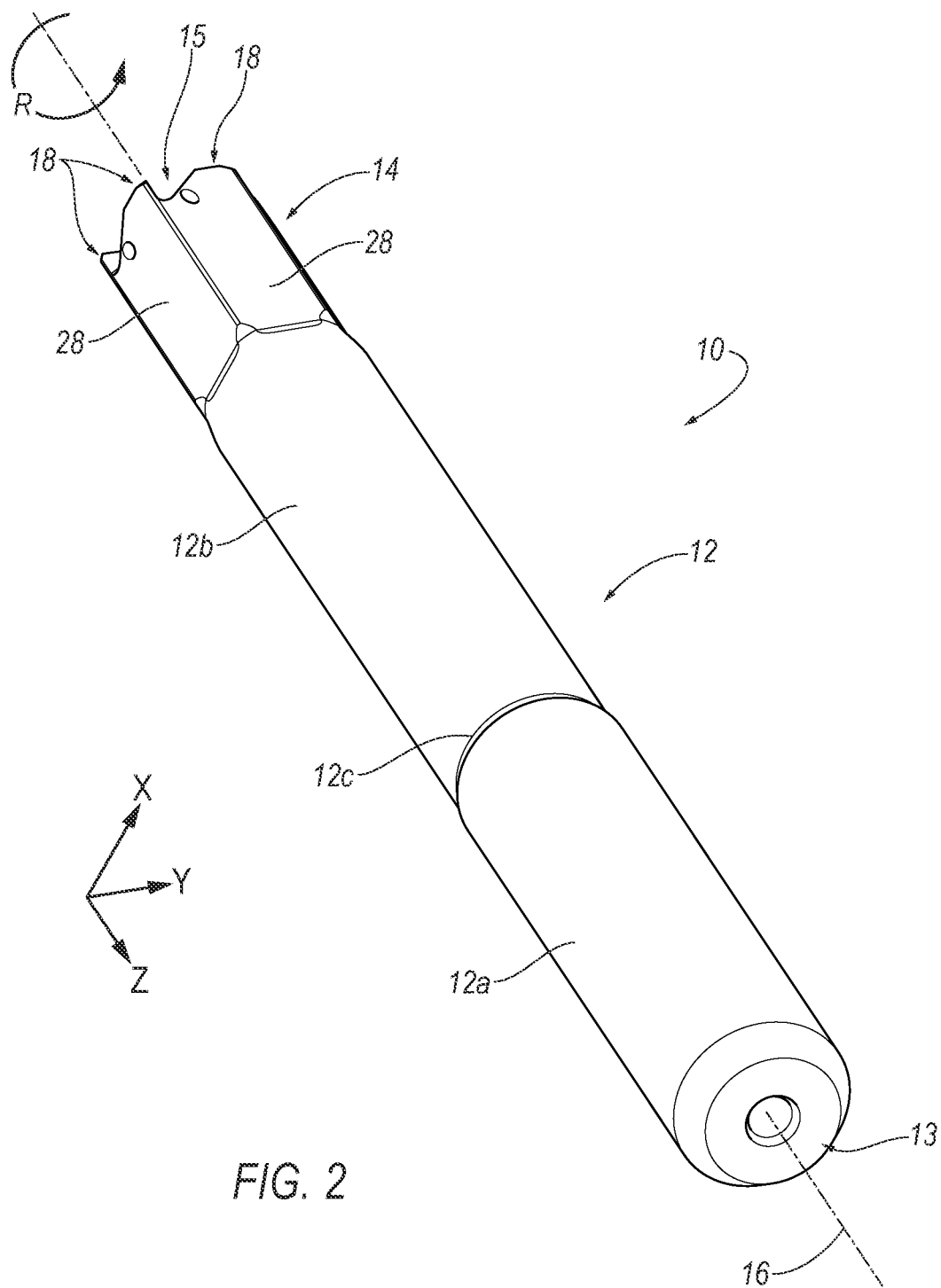
FIG. 2 is rear isometric view of the reamer of FIG. 1.
Figure 6:
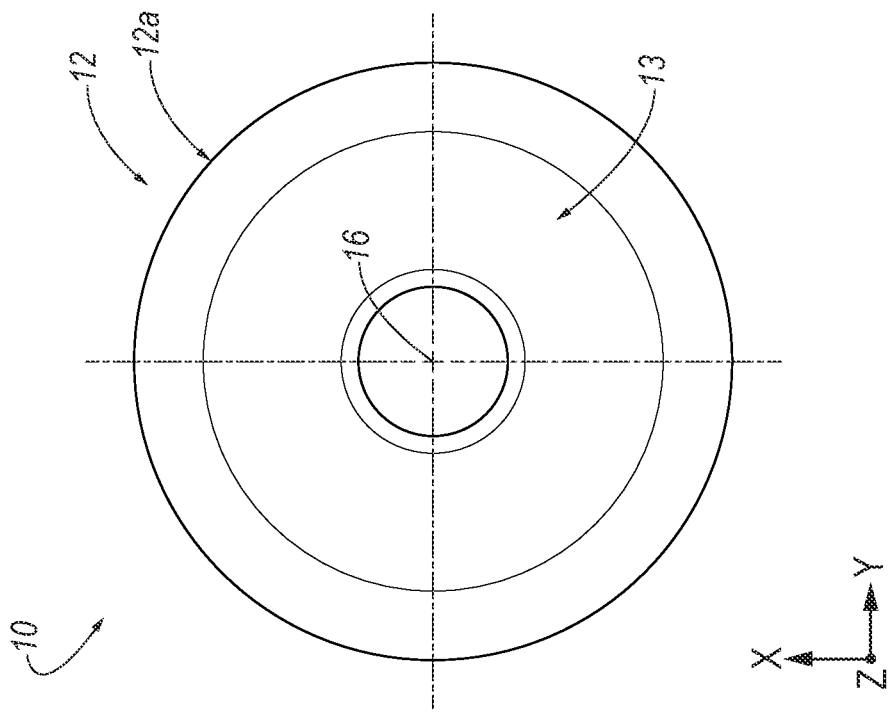
FIG. 6 is a rear end view of the reamer of FIG. 1.

Referring to FIGS. 1-10, wherein like reference characters represent like elements, a cutting tool, such as a reamer, is generally shown at 10, according to an embodiment of the invention. In general, the reamer 10 includes a shank portion 12 extending from a rear end 13, a cutting portion 14 extending from the shank portion 12 to a front end 15 and a central, longitudinal axis 16 extending substantially parallel to the z-axis. The shank portion 12 is capable of being received in a conventional machine tool holding chuck (not shown). During operation, the reamer 10 rotates about the central, longitudinal axis 16 in the direction, R, indicated by the arrow in FIGS. 1 and 2. Specifically, the reamer 10 rotates in a counterclockwise direction when viewed from the front end 15, as shown in FIG. 1, and in a clockwise direction when viewed from the rear end 13, as shown in FIG. 2.

In the illustrated embodiment, the shank portion 12 includes a first portion 12a extending from the rear end 13 to a second portion 12b having a relatively smaller diameter than the first portion 12a. The first portion 12a is separated from the second portion 12b by a tapered transition portion 12c. It will be appreciated that, in another embodiment, the first portion 12a and the second portion 12b can have the same diameter, or in another embodiment, the first portion 12a can have a relatively smaller diameter than the second portion 12b.

In general, the cutting portion 14 comprises a plurality of cutting teeth 18 separated by a gash 20. In one embodiment, the cutting teeth 18 are unequally indexed relative to one another. In another embodiment, at least three or four cutting teeth 18 are unequally indexed relative to one another. It will be understood that index angles can be individually or collectively adjusted to prevent chatter along the cutting portion 14 of the reamer 10 during cutting operations.

In the illustrated embodiment, the reamer 10 has a total of six cutting teeth 18 and six gashes 20 (i.e., one-to-one correspondence between teeth 18 and gashes 20). However, it will be appreciated that the invention is not limited by the number of cutting teeth 18 and gashes 20, and that the invention can be practiced with any desirable number of cutting teeth 18 and gashes 20, depending on the physical dimensions of the reamer 10. For example, the invention can be practiced with a reamer 10 having between two and twenty or more cutting teeth 18 and gashes 20.

Each tooth 18 has a cutting edge 22 extending in a longitudinal direction (i.e., parallel to the z-axis) from the front end 15 the substantially the entire length of the cutting portion 14 to proximate the shank portion 12. A margin 24 trails each cutting edge 22 and also extends to proximate the shank portion 12. Each tooth 18 also has a primary relief or clearance 26 formed between the cutting edge 22 and the front end 15. Each cutting tooth 18 also has a secondary relief or clearance 28 extending longitudinally between the margin 24 of one cutting tooth 18 and the cutting edge 22 of an adjacent cutting tooth 18.

Figure 5:
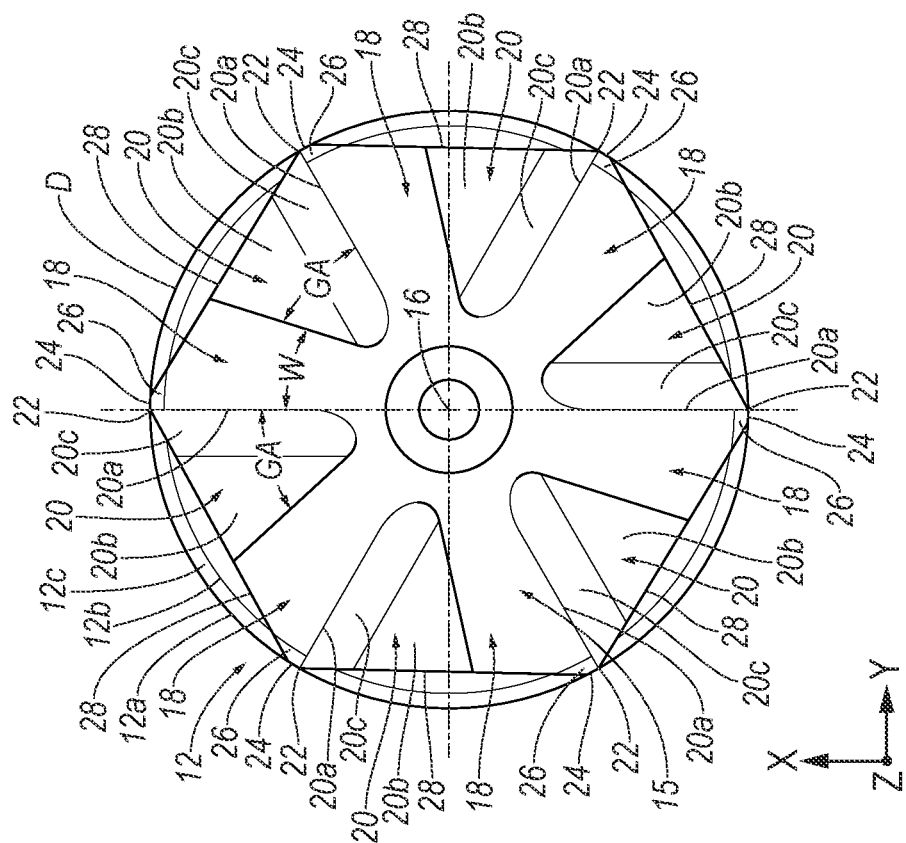
FIG. 5 is a front-end view of the reamer of FIG. 1.
Figures 7, 8:
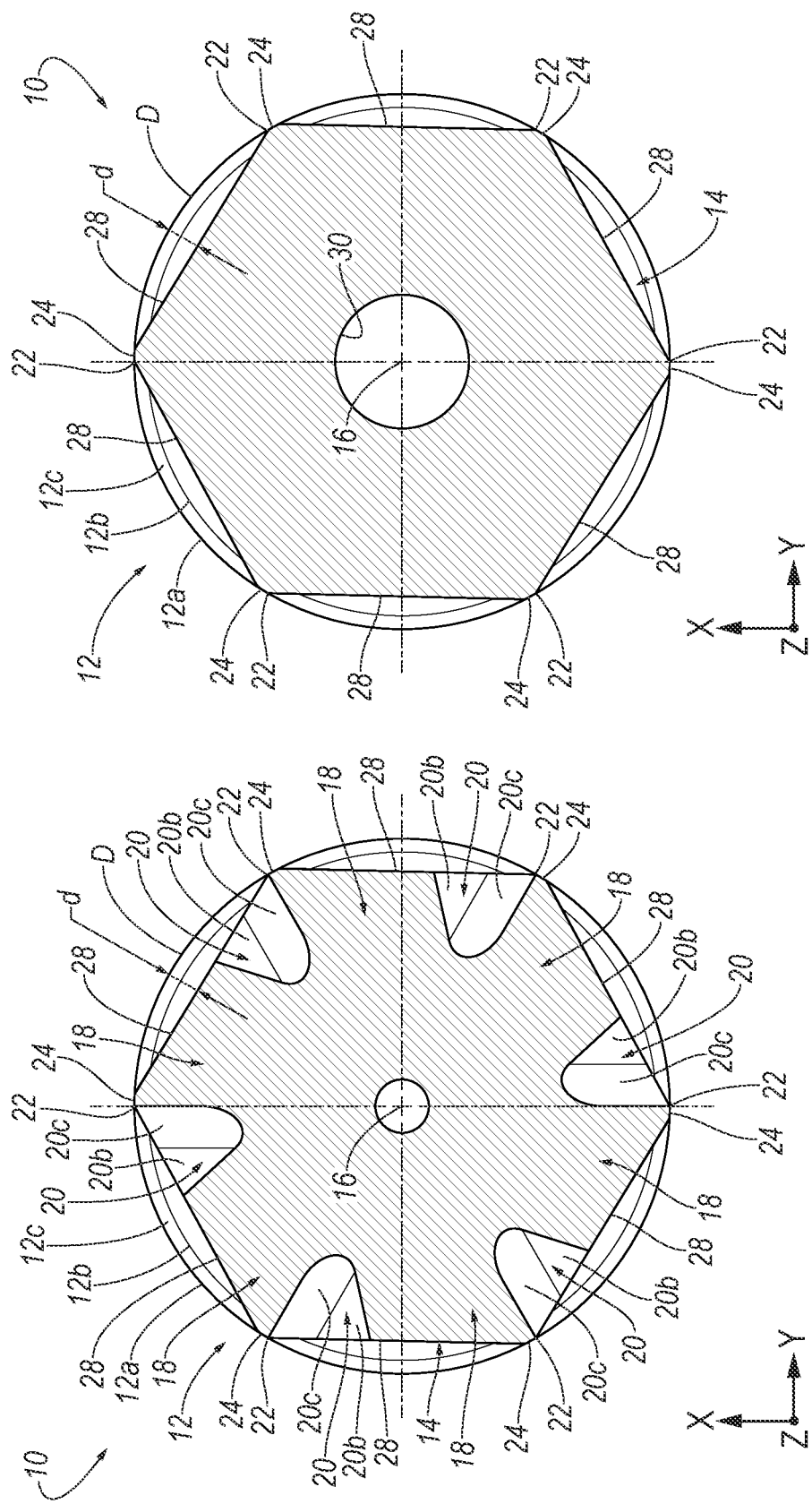
FIG. 7 is a cross-sectional view of the cutting portion of the reamer taken along line 7-7 of FIG. 3.
FIG. 8 is a cross-sectional view of the cutting portion of the reamer taken along line 8-8 of FIG. 3.

As seen in FIGS. 5, 7 and 8, each secondary relief or secondary clearance 28 extends substantially straight (i.e., extends substantially parallel to the central, longitudinal axis 16 of the reamer 10) between the cutting edge 22 of one cutting tooth 18 and the margin 24 of an adjacent cutting tooth 18. The secondary reliefs 28 cause the cutting portion 14 to be substantially polygonal in shape when viewed from the front end 15 of the reamer 10. In the illustrated embodiment, the reamer 10 has a total of six teeth 18 and gashes 20, and thus the cutting portion 14 of the reamer 10 is substantially hexagonal in shape when viewed from the front end 15. It will be understood that the secondary relief or clearance 28 causes the cutting portion 14 to have any polygonal shape, depending on the number of cutting teeth 18 and gashes 20. For example, the cutting portion 14 would be substantially triangular in shape in the case the reamer 10 has a total of three cutting teeth 18 and gashes 20, and so on. However, it will be appreciated that the invention can be practiced with a reamer having helically twisted secondary reliefs, rather than straight secondary reliefs.

As seen in FIGS. 5, 7 and 8, each gash 20 extends in a radial direction (i.e., substantially parallel to the x- and y-axis) and is substantially polygonal in shape. In the illustrated embodiment, each gash 20 is substantially V-shaped in cross-section and is defined by a leading side wall 20a (i.e., a leading face) of a first cutting tooth 18, a trailing side wall 20b (i.e., a trailing face) of a second, adjacent cutting tooth 18, and a radiused surface 20c therebetween. The radiused surface 20c is substantially concave with a radius of curvature, RC. The radiused surface 20c is one of the parameters that determines the size of the chips generated during a machining operation.

As shown in FIG. 5, each gash 20 is formed such that a width, W, of each cutting tooth 18 continuously increases in a radially outward direction (i.e., along the x- and y-axes) with respect to the central, longitudinal axis 16 when viewed from the front end 15 of the reamer 10. In other words, the width, W, of each tooth 18 is greatest proximate the cutting diameter, D, of the reamer 10 and narrows radially inwardly. As a result, the reamer 10 has an increased stiffness and durability, as compared to reamer designs in which the width, W, of each tooth decreases, rather than increases, in a radially outward direction. It is noted that the cutting diameter, D, is one of the parameters that determines the size of the chips generated during a machining operation.

Still referring to FIG. 5, each gash 20 defines a gash angle, GA, between the leading side wall 20a of the first cutting tooth 18 and the trailing side wall 20b of the second, adjacent cutting tooth 18. The gash angle, GA, can range between about 15 degrees to about 70 degrees. In one embodiment, at least two gashes 20 define substantially the same gash angle, GA. In another embodiment, all the gashes 20 have substantially the same gash angle, GA. As seen in FIG. 5, at least one pair of cutting teeth 18 is indexed such that each tooth in the pair is disposed approximately 180 degrees apart from the other tooth. In some embodiments, the reamer 10 can have at least two pairs of cutting teeth 18 disposed approximately 180 degrees apart from the other cutting tooth 18, or at least three pairs of cutting teeth 18 disposed approximately 180 degrees apart from the other cutting tooth 18. The gash angle, GA, is one of the parameters that determines the size of the chips generated during a machining operation.

During a reaming operation, the shape of each gash 20 is determined by three parameters: 1) the gash angle, GA; 2) the radius, RC, of the radiused surface 20c; and 3) the cutting diameter, D, of the reamer 10. By optimizing the above three parameters, short chips can be formed by causing the chips to curl and break during the reaming operation.

Referring now to FIGS. 4, 7 and 8, each gash 20 also extends a length, L, in a longitudinal direction (i.e., along the z-axis) from the front end 15 of the reamer 10. It is noted that the length, L, of each gash 20 is much shorter than a flute in a conventional reamer, thereby minimizing the flow of chips in the rearward direction (i.e., toward the rear end 13 of the reamer 10). The length, L, can be in the range between 0.5×D mm and about 1.0×D mm, where D is the cutting diameter.

In addition, a distance, d, between the secondary relief 28 and the cutting diameter, D, of the reamer 10 is much shorter than the distance between a flute and the cutting diameter in a conventional reamer. In the illustrated embodiment, the distance, d, is smaller than the size of the chips, thereby minimizing or preventing the chips from moving rearwardly of the gash 20. The distance, d, is in the range between about 1% and about 15% of the cutting diameter, D. As a result of the much shorter length, L, and the small distance, d, chips generated during a reaming operation are minimized or prevented from moving beyond the gash 20 in the rearward direction, unlike conventional reamers with flutes that extend rearward beyond the cutting portion.

Figure 9:
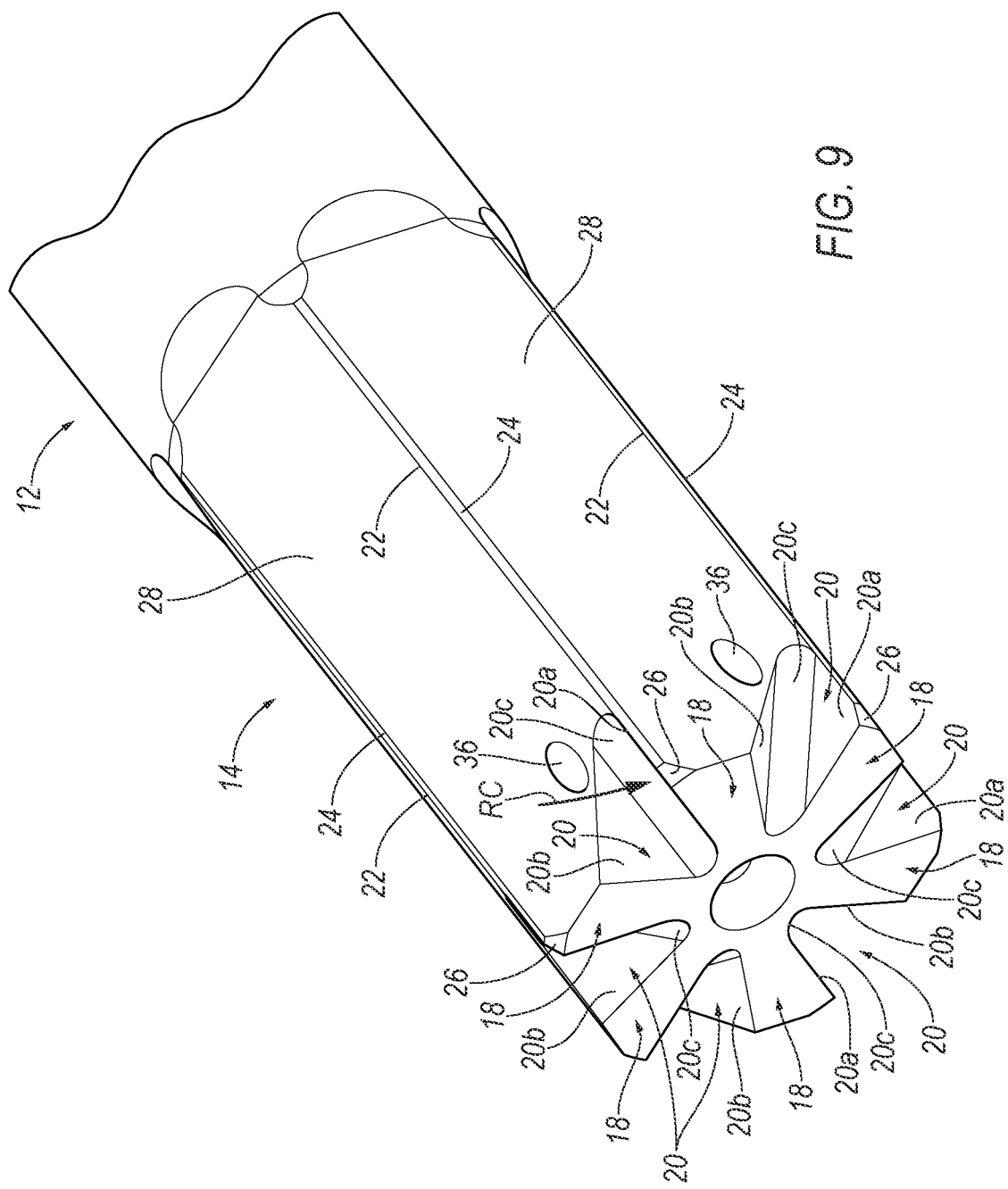
FIG. 9 is an enlarged front isometric view of the cutting portion of the reamer of FIG. 1.
Figure 10:
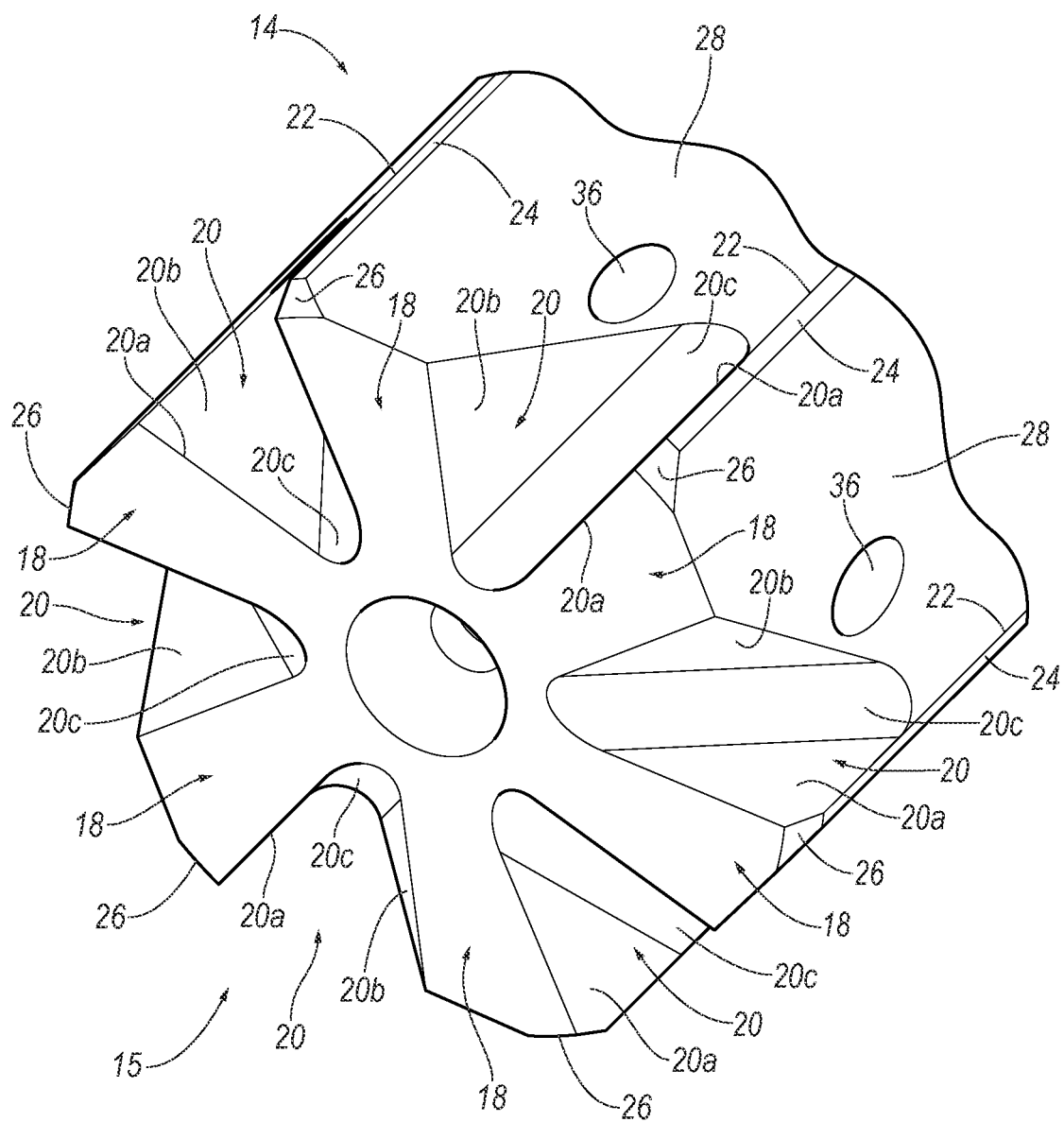
FIG. 10 is another enlarged front isometric view of the cutting portion of the reamer of FIG. 1.

Referring now to FIGS. 4, 9 and 10, the shank portion 12 has a main coolant bore 30 for allowing coolant and lubricant to pass therethrough. The main coolant bore 30 extends from the rear end 13 to a coolant header 32 in the cutting portion 14 of the reamer 10. The coolant header 32 is in fluid communication with the main coolant cavity 30 and provides coolant, lubricant, and the like, to a plurality of coolant bores 34. In the illustrated embodiment, there is a one-to-one correspondence between the number gashes 20 and the number of coolant outlet bores 34. Thus, the reamer 10 of the illustrated embodiment has a total of six coolant outlet bores 34 for providing fluid, such as coolant, lubricant, and the like, to the cutting teeth 18 of the reamer 10 (as indicated by the arrow in FIG. 2). As shown in FIGS. 9 and 10, coolant, lubricant, and the like, exit from each coolant outlet bore 34 through a coolant outlet port 36 located in a respective secondary relief 28 in proximity to a respective gash 20. In this manner, each coolant outlet port 36 is located so as to provide coolant within each gash 20, which is directed toward the front end 15 and into the cutting zone of the reamer 10. In addition, the coolant is directed to further prevent chips generated during a reaming operation to flow in the rearward direction.

As described above, the reamer 10 has a front gash design without flutes, unlike conventional reamer designs with flutes. In particular, the relatively shorter length, L, of the gash 20 and the relatively small distance, d, between the secondary relief 20 and the cutting diameter, D, along with the coolant being directed to the cutting zone ensures that chips move forward, not rearward, during reaming operations, thereby minimizing or eliminating damage to the hole surface and edge chipping. In addition, the design of the gash 20 of the reamer 10 can be produced with reduced grinding time, as compared to conventional reamer designs with flutes, thereby reducing manufacturing cost. Further, the design of the gash 20 of the reamer 10 enables a higher number of cutting edges 22, as compared to a reamer with the same cutting diameter and having a conventional reamer design.

The patents and publications referred to herein are hereby incorporated by reference.

Having described presently preferred embodiments the invention may be otherwise embodied within the scope of the appended claims.

What is claimed is:

1. A reamer, comprising:
   a shank portion extending from a rear end; and
   a cutting portion extending from the shank portion to a front end, the cutting portion being devoid of flutes and including a plurality of cutting teeth separated by a plurality of gashes, each cutting tooth having a cutting edge extending in a longitudinal direction from the front end to proximate the shank portion, the cutting portion including a margin trailing each cutting edge and extending along each cutting edge to proximate the shank portion, each cutting tooth also has a primary relief formed between the cutting edge and the front end and a secondary relief extending longitudinally between the margin of one cutting tooth to the cutting edge of an adjacent cutting tooth;
   a coolant bore that extends through the shank portion; and
   a plurality of coolant outlet ports that are in fluid communication with the coolant bore,
   wherein a coolant outlet port of the plurality of coolant outlet ports is located on the secondary relief of each cutting tooth and positioned rearward of a corresponding gash of the plurality of gashes such that fluid exiting the coolant outlet port is directed into the gash to prevent chips generated during a reaming operation from flowing in the rearward direction,
   wherein a width, W, of each cutting tooth increases in a radially outward direction with respect to a central, longitudinal axis of the reamer when viewed from the front end of the reamer.

2. The reamer of claim 1, wherein each gash extends a length, L, in the longitudinal direction from the front end of the reamer, and wherein the length, L, is in the range between about 0.5×D and about 1.0×D, where D is the cutting diameter.

3. The reamer of claim 1, wherein a distance, d, between the secondary relief of each cutting tooth and a cutting diameter, D, of the reamer is in a range between about 1% and about 15% of the cutting diameter, D.

4. The reamer of claim 1, wherein the secondary relief of each cutting tooth causes the cutting portion to be substantially polygonal in shape when viewed from the front end of the reamer.

5. The reamer of claim 1, wherein the shank portion includes a first portion extending from the rear end to a second portion having a relatively smaller diameter than the first portion, and wherein the first portion is separated from the second portion by a tapered transition portion.

6. The reamer of claim 1, wherein each gash is substantially V-shaped in cross-section and is defined by a leading side wall of a first cutting tooth, a trailing side of a second, adjacent cutting tooth, and a radiused surface therebetween, and wherein each gash defines a gash angle, GA, between the leading side wall of a first cutting tooth and a trailing side wall of a second, adjacent cutting tooth, and wherein the gash angle, GA, is in a range between about 15 degrees to about 70 degrees.

7. The reamer of claim 1, wherein the cutting teeth are unequally indexed relative to one another.

8. The reamer of claim 1, further comprising a coolant header in fluid communication with the coolant bore and the plurality of coolant outlet ports.

9. The reamer of claim 1, wherein there is a one-to-one correspondence between a number of gashes and a number of coolant outlet ports.

10. The reamer of claim 1, wherein:
each gash is defined by a leading side wall of one cutting tooth of the plurality of cutting teeth, a trailing side wall of an adjacent cutting tooth of the plurality of cutting teeth, and a radiused surface that is disposed between the leading side wall and the trailing side wall; and
the leading side wall is substantially parallel to the central, longitudinal axis.

11. A reamer, comprising:
a shank portion extending from a rear end; and
a cutting portion extending from the shank portion to a front end, the cutting portion being devoid of flutes and including a plurality of cutting teeth separated by a plurality of gashes, each cutting tooth having a cutting edge extending in a longitudinal direction from the front end to proximate the shank portion, the cutting portion including a margin trailing each cutting edge and extending along each cutting edge to proximate the shank portion, each cutting tooth also having a primary relief formed between the cutting edge and the front end and a secondary relief extending longitudinally between the margin of one cutting tooth to the cutting edge of an adjacent cutting tooth;
a coolant bore that extends through the shank portion; and
a plurality of coolant outlet ports that are in fluid communication with the coolant bore,
wherein a coolant outlet port of the plurality of coolant outlet ports is located on the secondary relief of each cutting tooth and positioned rearward of a corresponding gash of the plurality of gashes such that fluid exiting the coolant outlet port is directed into the gash to prevent chips generated during a reaming operation from flowing in the rearward direction,
wherein each gash extends a length, L, in the longitudinal direction from the front end of the reamer, and wherein the length, L, is in the range between about 0.05×D and about 1.0×D, where D is a cutting diameter of the reamer,
wherein a distance, d, between the secondary relief of each tooth and the cutting diameter, D, of the reamer is smaller than the size of the chips generated during a reaming operation, thereby minimizing or preventing the chips from moving rearwardly of each gash,
wherein each gash is defined by a leading side wall of one cutting tooth of the plurality of cutting teeth, a trailing side wall of an adjacent cutting tooth of the plurality of cutting teeth, and a radiused surface that is disposed between the leading side wall and the trailing side wall; and
wherein the leading side wall is substantially parallel to a central, longitudinal axis of the reamer.

12. The reamer of claim 11, wherein a width, W, of each cutting tooth increases in a radially outward direction with respect to the central, longitudinal axis when viewed from the front end of the reamer.

13. The reamer of claim 11, wherein the secondary relief of each cutting tooth cause the cutting portion to be substantially polygonal in shape when viewed from the front end of the reamer.

14. The reamer of claim 11, wherein the shank portion includes a first portion extending from the rear end to a second portion having a relatively smaller diameter than the first portion, and wherein the first portion is separated from the second portion by a tapered transition portion.

15. The reamer of claim 11, wherein each gash is substantially V-shaped in cross-section and is defined by a leading side wall of a first cutting tooth, a trailing side of a second, adjacent cutting tooth, and a radius blend or root therebetween, and wherein each gash defines a gash angle, GA, between the leading side wall of a first cutting tooth and a trailing side wall of a second, adjacent cutting tooth.

16. The reamer of claim 11, wherein the cutting teeth are unequally indexed relative to one another.

17. The reamer of claim 11, further comprising a coolant header in fluid communication with the coolant bore and the plurality of coolant outlet ports.

18. The reamer of claim 11, wherein there is a one-to-one correspondence between a number of gashes and a number of coolant outlet ports.

19. A reamer, comprising:
a shank portion extending from a rear end; and
a cutting portion extending from the shank portion to a front end, the cutting portion being devoid of flutes and including a plurality of cutting teeth separated by gashes, each cutting tooth having a cutting edge extending in a longitudinal direction from the front end to proximate the shank portion, the cutting portion including a margin trailing each cutting edge and extending along each cutting edge to proximate the shank portion, each cutting tooth also has a primary relief formed between the cutting edge and the front end, and a secondary relief extending longitudinally between the margin of one cutting tooth to the cutting edge of an adjacent cutting tooth;
a coolant bore that extends through the shank portion; and
a plurality of coolant outlet ports that are in fluid communication with the coolant bore,
wherein a coolant outlet port of the plurality of coolant outlet ports is located on the secondary relief of each cutting tooth and positioned rearward of a corresponding gash of the plurality of gashes such that fluid exiting the coolant outlet port is directed into the gash to prevent chips generated during a reaming operation from flowing in the rearward direction.

20. The reamer of claim 19, wherein:
each gash is defined by a leading side wall of one cutting tooth of the plurality of cutting teeth, a trailing side wall of an adjacent cutting tooth of the plurality of cutting teeth, and a radiused surface that is disposed between the leading side wall and the trailing side wall; and the leading side wall is substantially parallel to a central, longitudinal axis of the reamer.

* * * * *